United States Patent
Tremblay et al.

(10) Patent No.: US 6,783,713 B2
(45) Date of Patent: Aug. 31, 2004

(54) FILTERS FOR REMOVAL OF PATHOGENS FROM LIQUIDS

(75) Inventors: Mario Elmen Tremblay, West Chester, OH (US); Steve Gary Fishter, Harrison, OH (US); Dimitris Ioannis Collias, Mason, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 92 days.

(21) Appl. No.: 10/303,390

(22) Filed: Nov. 25, 2002

(65) Prior Publication Data

US 2003/0106851 A1 Jun. 12, 2003

Related U.S. Application Data

(62) Division of application No. 09/564,919, filed on May 4, 2000, now abandoned.
(60) Provisional application No. 60/132,309, filed on May 3, 1999.

(51) Int. Cl.[7] ............................ D04H 1/16; B01D 39/00
(52) U.S. Cl. ...................................... 264/113; 210/502.1
(58) Field of Search .................................. 264/114, 500, 264/570, 113; 210/502.1

(56) References Cited

U.S. PATENT DOCUMENTS

| | | | |
|---|---|---|---|
| 5,830,414 A | * 11/1998 | Ishii et al. | 422/122 |
| 5,928,588 A | * 7/1999 | Chen et al. | 264/113 |
| 5,951,744 A | * 9/1999 | Rohrbach et al. | 96/154 |

* cited by examiner

*Primary Examiner*—Chester T. Barry
(74) *Attorney, Agent, or Firm*—S. Robert Chuey; Theodore P. Cummings; James C. Vago (57) ABSTRACT

A process for forming an activated carbon fiber filter for removing viruses from liquids is provided. The process includes selecting a plurality of activated carbon fibers, placing the activated carbon fibers in a hollow form open at least one end, and applying a predetermined compressive force to the fibers along the axis through the hollow form parallel to the direction in which the liquid will pass until the fibers are densely and uniformly packed within the form.

1 Claim, 2 Drawing Sheets

FILTERS FOR REMOVAL OF PATHOGENS FROM LIQUIDS

CROSS REFERENCE TO RELATED APPLICATION

This application is a divisional application of application Ser. No. 09/564,919 filed on May 4, 2000, now abandoned which claims priority under Title 35, United States Code 119(e) from Provisional Application Ser. No. 60/132,309, filed May 3, 1999, the substances of which are incorporated herein by reference.

TECHNICAL FIELD

The present invention relates to filters capable of removing various contaminants, including pathogens, from liquids by filtration. In particular, it relates to filters that comprise activated carbon fibers for removing a broad spectrum of contaminants, including viruses, from liquids. Additionally, it relates to a method of removing contaminants from liquids.

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants must be removed before the water can be used. For example, in many medical applications and in the manufacture of certain electronic components, extremely pure water is required. As a more common example, any harmful contaminants must be removed from water before it is potable, i.e., fit to consume. Despite modern water purification means, the general population is at risk, and in particular infants and persons with compromised immune systems are at considerable risk.

In the U.S. and other developed countries, municipally treated water typically includes one or more of the following impurities: suspended solids, bacteria, parasites, viruses, organic matter, heavy metals, and chlorine. Breakdown and other problems with water treatment systems sometimes lead to incomplete removal of potential pathogens. For example, cryptosporidiosis, a type of waterborne microbiological contamination, was brought to national attention in April of 1993 when the water supply of the city of Milwaukee, Wis. became contaminated with cryptosporidium cysts resulting in 400,000 cases of the disease and over 100 related deaths.

In other countries there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

In the U.S., the National Sanitation Foundation (NSF), based on Environmental Protection Agency (EPA) studies, introduced standards that must be met for drinking water. The purpose of these standards is to establish minimum requirements regarding the performance of drinking water treatment systems that are designed to reduce specific health related contaminants in public or private water supplies. Established in 1997, Standard 53 requires that the effluent from a water supply source exhibit 99.9% removal of parasites against a challenge. Established in 1991, Standard 55 requires that the effluent from a water supply source exhibit 99.99% removal of viruses and 99.9999% removal of bacteria against a challenge. One microorganism for each class of pathogen is used to demonstrate that the filter system is adequately treating for the respective pathogens. As a representative microorganism for parasites/protozoa, cryptosporidium is used. Because of the prevalence of *E. coli* (bacterium) in water supplies, and the risks associated with its consumption, this micro-organism is typically used as the bacterium. Also, MS-2 bacteriophage is typically used as the representative microorganism for virus removal because its size and shape (i.e., 25 nm and spherical) make it a particularly difficult microorganism to be removed from liquids, relative to other viruses. Thus, a filter's ability to remove MS-2 bacteriophage demonstrates its ability to remove other viruses Therefore there is a need for a filter capable of removing a broad spectrum of contaminants. This filter would comprise a single, small, lightweight, self-contained system rather than a complex multi-component and/or multistage system to remove the various contaminants. Such a filter would not only be more reliable than a complex system, but it would also be far more portable and economical. Thus, it could be utilized as a simple device on faucets in domestic settings where well water or water from a municipal source is used. In another application, such a device could be utilized in lesser developed regions of the world on a faucet or container for storing drinking water, where communal water sources are shared, but little is done to treat the water for contamination. A small, inexpensive, easy-to-use, water filter would be of great humanitarian and economic value. In certain applications, the filter should present a low resistance to the flow of water so that in locations where electricity necessary to drive a pump may be unavailable, the filter may simply be connected between upper and lower containers of water, or between the holding container and a drinking receptacle. In certain embodiments, the filter should also have sufficient structural integrity to withstand significant pressures if, for example, a source of pressure is available to drive the liquid through the filtering apparatus (e.g. mechanical pump, faucet pumped water, etc.).

Despite centuries of a well-recognized need and many development efforts, activated carbon in its various forms has never been shown to reliably remove pathogens from water or enjoyed wide-spread commercial use for pathogen removal per se. Many attempts have been made over the years to apply activated carbon to pathogen removal without notable success. In the United States, the patent literature reflects that improved activated carbon materials and water treatment structures have been sought for water purification since at least the 1800's. For example, U.S. Pat. No. 29,560 teaches that an adsorptive carbon can be made by combining peat, cut out of the bog, with chalk in water to make a paste, followed by molding and firing. U.S. Pat. No. 286,370 teaches that artificial bone black blocks made from a slurry of finely powdered charred bones and magnesia can be used to good effect in water filters.

The prior art teaches away from using activated carbon alone, by teaching that a supplemental means must be used for pathogen removal, such as the use of biocides, pasteurization (heating), electricity, distillation or high-energy radiation such as UV or X-rays. Additionally, the U.S. EPA has taught against the use of activated carbon alone for pathogen removal, stating that "activated carbon [even] with silver does not eliminate all bacteria in water and cannot remove protozoa and viruses." (See 59 Federal Register 223, Nov. 21, 1994.) As an example of the use of separate pathogen removal means, U.S. Pat. No. 4,828,698 (Jewell et al., issued May 9, 1989) teaches the use of a microporous membrane having pore sizes from 0.02 µm to 0.5 µm for microbiological control. U.S. Pat. No. 4,576,929 (Shimazaki et al., issued Mar. 18, 1986); U.S. Pat. No. 5,705,269 (Leiberman, issued Jan. 6, 1998); and U.S. Pat. No. 5,607,595 (Hiasa et al., issued Mar. 4, 1997) teach the use of silver, organic pesticides, and periodic heating to supplement activated carbon use. U.S. Pat. No. 3,770,625 (Wallis et al., issued Nov. 6, 1973) teaches that viruses can be removed from a liquid using activated carbon forms (granular, powdered or pelleted) treated with a sodium containing hydrolyzing composition, such as sodium hydroxide, after an acid wash. The '625 patent further teaches that the method did not provide stand-alone treatment stating "it is frequently desirable to have filtration downstream of the activated charcoal to remove any sluffed-off adsorbing medium." U.S. Pat. No. 5,762,797 (Patrick et al., issued Jun. 9, 1998) discloses the use of a separate nonwoven, which is treated with an antibacterial material, to effect treatment of the bacteria. German Patent Publication No. 3,020,615 (Beauman et al., published Dec. 11, 1980) discloses the addition of silver-containing compounds to effect antibacterial activity. More recently, activated carbon fibers have been employed in water purification/filtration devices. See, e.g., U.S. Pat. No. 4,576,929 (Shimazaki, issued Mar. 18, 1986), U.S. Pat. No. 5,705,269 (Pimenov et al., issued Jan. 6, 1998), and European Patent No. EP 366,539B 1 (Kaneko, published Mar. 25, 1998). While these and other prior art references have previously utilized activated carbon, including activated carbon fibers, in water filters, it is evident that the activated carbon is being employed to remove organic matter. Thus, to the extent that certain prior art references disclose the use of activated carbon to treat a water source with respect to pathogen removal, including viruses, such approaches require the use of additional treatment steps or they require a relatively complex assembly of components.

In view of the foregoing, it has now been surprisingly discovered that a filter comprising activated carbon fibers alone can reliably remove a wide range of microorganisms from water, including very small microorganisms such as MS-2 bacteriophage to much larger pathogens such as *E. coli* bacteria. Accordingly, an object of the present invention is to provide an improved filter for removing contaminants from a water source. A specific object includes providing a water filter which removes a broad spectrum of contaminants, including pathogens and in particular viruses from the water source. The removal of such pathogens using the present filter is at a level not previously demonstrated by the prior art. Such a filter will preferably present a low resistance to the flow of liquid through the apparatus, and will remove the contaminants from a substantial volume of water before becoming saturated. In certain embodiments, the filter will also preferably be relatively portable.

SUMMARY OF THE INVENTION

A process for forming an activated carbon fiber filter for removing viruses from liquids is provided. The process includes selecting a plurality of activated carbon fibers, placing the activated carbon fibers in a hollow form open at least one end, and applying a predetermined compressive force to the fibers along the axis through the hollow form parallel to the direction in which the liquid will pass until the fibers are densely and uniformly packed within the form.

DETAILED DESCRIPTION OF THE PRESENT INVENTION

I. Definitions

As used herein, an "activated carbon fiber" ("ACF") means activated carbon in a form having a high aspect ratio, i.e., ratio of length to diameter. For purposes of the present discussion an individual activated carbon fiber will have an aspect ratio of at least about 2.

As used herein, a "filter" is any article of manufacture containing the activated carbon fibers to enable their function in removing pathogens from liquid. Such a filter may be as simple as the fibers and an enclosure means to retain the fibers. It is apparent that such an enclosure must be capable of preventing loss of fibers during operation, as well as maintaining the desired inter-fiber network during use. Various representative embodiments for the filter of the present invention are described below.

As used herein, the terms "filters" and "filtration" refer to removal mechanisms via either or both of adsorption and size exclusion.

As used herein, the term "free" means that the individual fibers are not bonded together by use of a resin binder material that requires curing and carbonization. The avoidance of employing such a resin binder facilitates production of the filter, in that it is not necessary to exert additional energy in curing and setting the resulting fiber/binder mixture that is created, nor is it necessary to exert additional energy in removing the water necessary for making the fiber/binder slurry.

As used herein, the terms liquid and water are used interchangeably.

As used herein, the terms "microorganism", "microbiological organism" and "pathogen" are used interchangeably. These terms refer to various types of microorganisms that can be characterized as bacteria, viruses, parasites, protozoa, and germs.

II. Activated Carbon Fibers

Activated carbon fibers can be characterized by their length, diameter, porosity, specific surface area, and elemental composition. Length is meant to describe the distance from end to end of a fiber. The diameter refers to the mean diameter of a fiber. Porosity is characterized by the mean pore size of the fiber. Specific surface area is a measure of the fiber surface, including the area within the pores, per unit of mass of fiber. For the present invention, activated carbon fibers will preferably have: specific surface areas in a range of from about 100 to about 4000 $m^2/g$, more preferably from about 500 to about 3000 $m^2/g$, still more preferably about 1000 to about 2500 $m^2/g$; diameters in a range of from about 5 to about 50 µm, more preferably about 10 to about 25 µm, still more preferably about 15 to about 20 µm; and pore sizes from about 2.5 Å to about 300 nm, more preferably from about 5 Å to about 200 nm, still more preferably from about 10 Å to about 100 nm. The fibers can be solid or hollow. Activated carbon fibers have a narrow, sub-micron range of surface features not found in other activated carbon forms such as granules, pellets, or other irregular shapes impregnated with carbon.

The manufacture of activated carbon fibers is described thoroughly in the literature and such fibers are available commercially from several sources. In general, carbonized fibers are made by carbonizing polyacrylonitrile (PAN), phenol resin, pitch, cellulose fiber or other fibrous carbon surfaces in an inert atmosphere. The raw materials from which the starting fibers are formed are varied, and include pitch prepared from residual oil from crude oil distillation, residual oil from naphtha cracking, ethylene bottom oil, liquefied coal oil or coal tar by treatment such as filtration purification, distillation, hydrogenation or catalytic cracking. The starting fibers may be formed by various methods, including melt spinning and melt blowing. Carbonization and activation provide fibers having higher surface areas. For example, activated carbon fibers produced from petroleum pitch are commercially available from Anshan East Asia Carbon Fibers Co., Inc. (Anshan, China) as Carboflex® pitch-based Activated Carbon Fiber materials, and Osaka Gas Chemicals Co., Ltd. (Osaka, Japan) as Renoves A® series-AD'ALL activated carbon fibers. The starting material is a heavy petroleum fraction from catalytic cracking which must be purified to removed catalyst fines, ash and other impurities. Pitch is produced by distillation, thermal cracking, solvent extraction or combined methods. Anshan's Carboflex® pitch-based activated carbon fiber materials are 20 $\mu$m in diameter with a specific surface area of about 1,000 $m^2/g$. They come in various lengths such as:

P-200 milled activated carbon fibers 200 $\mu$m length
P-400 milled activated carbon fibers 400 $\mu$m length
P-600 T milled activated carbon fibers 600 $\mu$m length
P-3200 milled activated carbon fibers 3.2 mm length
C-6 chopped activated carbon fibers 6 mm length Osaka Gas Chemicals' Renoves A® series-AD'ALL activated carbon fibers are 18 $\mu$m in diameter with various specific surface areas ranging from 1,000 to 2,500 $m^2/g$. They come in various lengths such as (the specific surface areas are noted in parentheses):

A-15 milled AD'ALL activated carbon fibers 700 $\mu$m length (1500 $m^2/g$)
A-20 milled AD'ALL activated carbon fibers 700 $\mu$m length (2000 $m^2/g$)
A-15 Chopped AD'ALL activated carbon fibers 6 mm length (1500 $m^2/g$)
A-20 Chopped AD'ALL activated carbon fibers 6 mm length (2000 $m^2/g$)
A-10 Random lengths AD'ALL activated carbon (1000 $m^2/g$)
A-15 Random lengths AD'ALL activated carbon (1500 $m^2/g$)
A-20 Random lengths AD'ALL activated carbon (2000 $m^2/g$)
A-25 Random lengths AD'ALL activated carbon (2500 $m^2/g$)

III. Filters

A. Structures

Bulk density is commonly used in the art to describe carbon containing structures. The filters of the present invention will have a bulk density of from about 0.15 to about 0.8 $g/cm^3$, preferably from about 0.16 to about 0.6 $g/cm^3$, still more preferably about 0.2 to about 0.4 $g/cm^3$. In having calculated the bulk density and knowing the dimensions of the activated carbon fiber we can determine the average interstitial spacing between fibers. It is discovered that interstitial spacing between fibers (also called inter-fiber spacing) is the critical parameter which controls the removal of microorganisms. Optimal interstitial spacing is achieved when the activated carbon fibers are compressed along the longitudinal or flow axis of the filter.

While not wishing to bound by theory, it is believed that the surprising ability of the present filters to remove small pathogens, particularly viruses, is due to inter-fiber spacing that results from the packing of the activated carbon fibers. It is believed that the attachment of microorganisms, and in particular bacteria and viruses, onto activated carbon fibers is governed by electrostatic, van der Waals, and hydrophobic forces. These forces have different signs, or equivalently, some of them are attractive and some repulsive. For example, the electrostatic forces are typically repulsive since most of the surfaces are negatively charged (except for modified surfaces as well as some unmodified clay structures and asbestos). On the other hand, van der Waals and hydrophobic forces are typically attractive. The net effect of all these forces is typically a minimum in the interaction energy, called secondary minimum, that causes microorganisms to attach to surfaces. In terms of interaction distances, electrostatic forces have a characteristic distance of about 50 nm, whereas van der Waals forces have a characteristic distance of about 100 nm. In addition to the above forces, microorganisms such as bacteria and viruses, due to their structural characteristics, contain polymeric outer shells and in some cases appendages of various lengths. Furthermore, microorganisms excrete various polymeric substances during their metabolic cycle that is believed to cause strengthening of the attachment as well as increase in the attachment sites for microorganisms that follow them.

In terms of the mechanics of the flow of pathogens in the filter, it is believed that the distance between two adjacent fibers, c, is critical in achieving attachment of pathogen to the fibers (see FIG. 2). In general, pathogens might flow close to the surface of a fiber so that the overall attractive force would cause them to attach to the surface (see pathogen A in FIG. 2). On the other hand, pathogens might flow far away from the fiber surface so that the overall attractive force cannot "pull" them towards the fiber surface for attachment (see pathogen B in FIG. 2).

In terms of the effect of the inter-fiber distance (also called spacing) on pathogen attachment onto the fiber surfaces, it is believed that there is an optimum range of inter-fiber distances that is necessary for pathogen attachment to fibers and removal from water. When this inter-fiber distance, c (see FIG. 2), is relatively large, then the majority of pathogens do not come close to the fiber surface for the forces mentioned above to cause attachment to the surfaces. As a result, the majority of pathogens does not get removed from the incoming water, and thus behave as pathogen B in FIG. 2. On the other hand, when this inter-fiber distance is relatively small, then the majority of pathogens come close to the surface of the fibers and experiences the forces mentioned above. However, the shear conditions at these small gaps are high, and it is expected that the shear forces are high enough to overcome the attractive forces between pathogen and carbon surfaces. In these conditions there might be some pathogens that behave like pathogens A in FIG. 2 that do get attached to the fibers. However, it is expected that due to high shear forces these pathogens might experience dislodging at some later point in time. As a result, the majority of pathogens do not get removed from the incoming water. Therefore, there is an optimum range of inter-fiber spacing that strikes a balance between shear forces, attractive and repulsive forces. This balance insures that pathogens get removed during their flow in the carbon fiber filters.

One process for building an activated carbon fiber filter capable of removing viral pathogens from a liquid comprises placing activated carbon fibers into a hollow cylinder and applying linear force along the axis of the cylinder, thus compressing the fibers. It is to be understood that the liquid to be treated will be flowed along the axis of the cylinder which is also the axis of compression. The axial compression described is but one means of compressing fibers and other means of compression include, but is not limited to, hydraulic pressure across a membrane, opposed knuckles on a roller pressing against the fibers placed in a hollow form, a levered pressing element, or a hydraulic press. It is to be further understood that the cylinder could as well be any other shape such as box, cone which lends itself to axial compression of the fibers. Optionally, where the fibers are not compressed into the final structure housing, they may be bound by an adhesive means. Additionally, the activated carbon fibers can be shaped into an annular shape to take advantage of radial flow.

Further and optionally, the carbon fibers may be selected from a range of diameters so that when placed together, the interstitial spacing between the first, and larger, diameter fibers will closely conform to the second, and smaller, diameter fibers, and so that successively smaller diameter fibers will closely conform with the remaining interstitial space between the various selected larger fibers. By the selection of fiber diameters and lengths the size, form, and surface area of the interstitial space can be substantially controlled and made uniform at a smaller scale than would be possible if a single fiber diameter is used. Additionally, the activated carbon fibers may be combined with other materials, of different shapes, to control interstitial spacing. Such materials may be carbonaceous or non-carbonaceous. Further and optionally, the activated carbon fibers may be treated with a bacteriostatic agent such as closely bound silver or other bacteriostatic means to prevent bacterial colonies from developing on the activated carbon surfaces.

Figure 1:
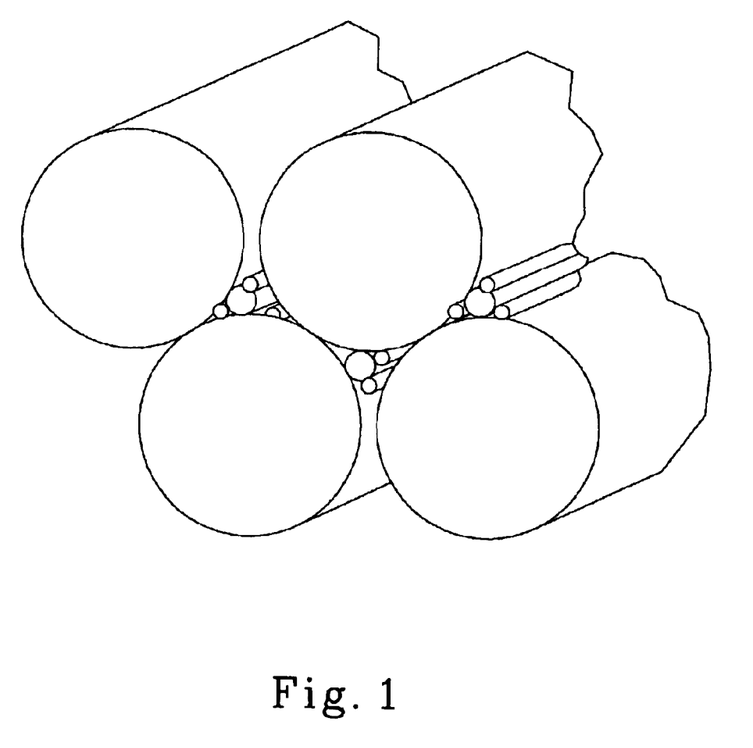
FIG. 1 is a cross sectional view of a plurality of activated carbon fibers. The fibers have varying diameters.
Figure 2:
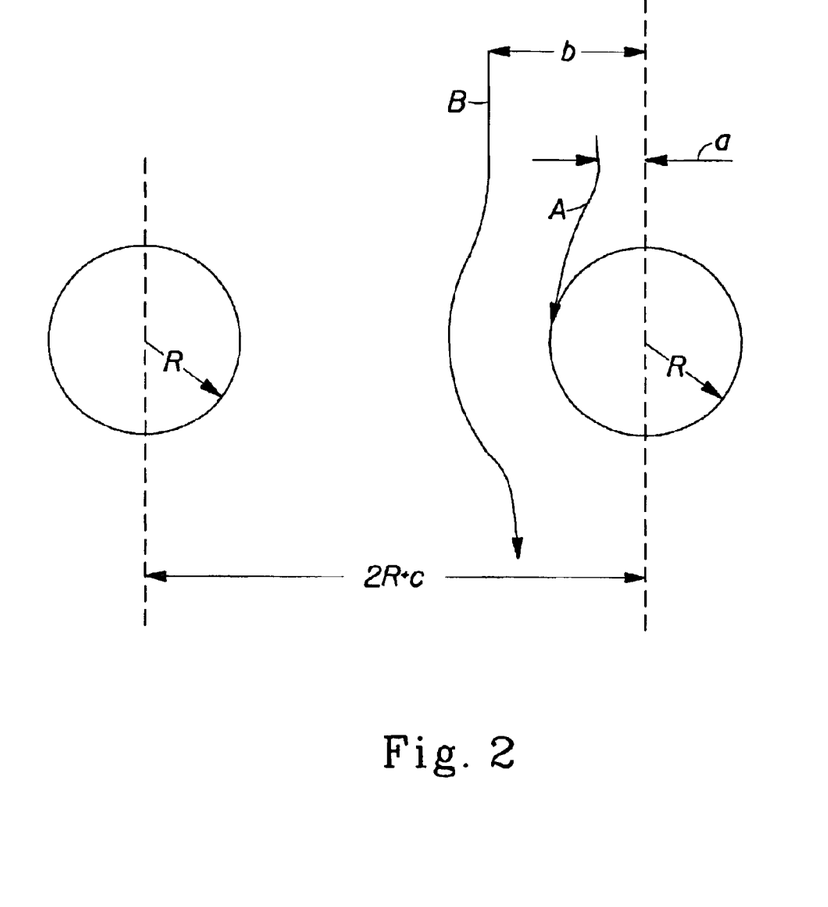
FIG. 2 is a cross sectional view of two activated carbon fibers. Also depicted are the respective paths taken by two pathogens.

In one embodiment illustrated in FIG. 1, the activated carbon filter may be comprised of aligned larger fibers compressed with a plurality of smaller fibers so that the smaller fibers fill in the interstitial space between the large fibers forming successively smaller and parallel interstitial spaces along the axis of the fibers and continuous in the axial fiber direction through the entire structure. In this embodiment it can be seen that the size of the interstitial spaces created is much smaller than the fiber members and uniform through the structure and can readily be controlled by the diameter of the fibers selected.

B. Pathogen Removal Properties

The filters of the present invention comprise activated carbon fibers, wherein the filter is capable of removing from a water source at least 99.99% of viruses. That is, the filter has a Virus Removal Index (VRI) of at least 99.99%. Preferably, the filter will have a VRI of at least about 99.999%, more preferably at least about 99.9999%. In addition to this VRI capacity, the filters will also preferably be capable of removing at least about 99.9999% of bacteria; i.e., the filter will have a Bacteria Removal Index (BRI) of at least 99.9999%. Preferably, the filter will have a BRI of at least about 99.99999%, more preferably at least about 99.999999%. Furthermore, the filter will preferably be capable of removing at least 99.9% of parasites/protozoa; i.e., the filter will have a Parasite Removal Index (PRI) of at about 99.9%. Preferably, the filter will have a PRI of at least 99.99%, more preferably 99.999%.

The method of the present invention relates to the use of the one of the above filters to remove from a water source at least about 99.99% of viruses. Preferably, the method will remove at least about 99.9999% of bacteria and 99.9% of parasites. More preferably, the method will remove from a water source at least 99.999% of viruses, still more preferably at least about 99.9999% of viruses.

The article of manufacture of the present invention comprises:

(a) a filter comprising activated carbon fibers, wherein said filter has a VRI of at least about 99.99% (preferably the VRI will be about 99.999%, more preferably at least about 99.9999%); and (b) instructions which inform a user that the filter device may be used to remove pathogens, especially viruses, from a water source.

It is evident that the filter devices and methods of the present invention allow the treatment of water in excess of the standards set forth by the EPA in the U.S. In addition, applicants have found that the filters of the present invention may be used for long periods of time without becoming exhausted in terms of the ability to continue to remove pathogens from the source stream. The use of such filters therefore obviously would improve the health risk situation in many countries, based on the fact that the population in general would have less exposure to the various pathogens, particularly viruses. Perhaps more importantly, in those geographies where contamination of the source water is significantly worse than that observed in developed countries, the benefits provided by the present invention are magnified. For example, the ability to remove pathogens at such a high level for such a long period of usage (i.e., before they reach failure because of saturation with the various pathogens) allows for the purification, in terms of making water potable without undue health risk, of highly contaminated water.

C. Other Filter Components

As indicated, the device will also include a housing for containing the activated carbon fibers. A pre-filter can be used to provide particulate filtration of suspended solids that exceed 10 to 100 $\mu$m in size. A biocidal agent such as silver can be used to prevent biofilm formation with the filter system.

In one embodiment, the filter will comprise a housing containing a generally cylindrical filter arrangement. The housing has a liquid inlet and a liquid outlet and defines a liquid flow path between the inlet and outlet. The activated carbon fiber arrangement is disposed within the housing in the liquid flow path and comprises a cylindrically shaped porous structure for removing particulate contaminants, chemical contaminants and microbiological contaminants from the liquid. The filter also includes impervious end members mounted to the ends of the filter arrangement, one of the end members having a central aperture. These end members direct liquid flow through the filter.

D. Articles of Manufacture

The present invention in another aspect comprises an article of manufacture comprising the filter and information that will inform the consumer, by words and/or by pictures, that use of the filter will provide water filtration benefits which include removal of pathogens, particularly viruses, and this information may include the claim of superiority over other filter products. In a highly desirable variation, the article of manufacture bears the information that informs the consumer that the use of the filter provides reduced levels of pathogens, including viruses. Accordingly, the use of packages in association with information that will inform the consumer, by words and/or by pictures, that use of the filter will provide benefits such as improved reduction of water contaminants as discussed herein, is important. The information can include, e.g., advertising in all of the usual media, as well as statements and icons on the package, or the filter itself, to inform the consumer.

IV. Test Methods for Measuring Pathogen Removal Indices

The following is a description of methods for assessing a filter's ability to remove viruses (i.e., its Virus Removal Index), bacteria (i.e., its Bacteria Removal Index) and parasites (i.e., its Parasite Removal Index) when exposed to a challenge consisting of water containing those pathogens. Removal, in the context of this discussion, refers to a filter's ability to exclude pathogens from a source fluid by size exclusion and/or adsorption. Removal does not include the killing of pathogens by heat, radiation, use of an antimicrobial and the like. Thus, where a test filter is to be assessed for its pathogen removal indices according to the following test methods, that filter should not be treated with, e.g., antimicrobial agents, in order to assess the filter's true "removal" properties.

A. Concentrated Stock Preparation (1). *Escherichia coli* (*E. coli*)

Preparation of *E. coli* from American Type Culture Collection (ATCC): *E. coli* (ATCC #15597, and ATCC #25922) are received in a lypholyzed package. The *E. coli* are resuspended with 1 ml of tryptic soy broth ("TSB") (Difco, (Becton/Dickinson), Spark, Md.). The resuspensions are added by means of a loop to the solid tryptic soy agar in a 92 mm×16 mm sterile Petri dish and five slant tubes. The tryptic soy agar ("TSA") (Difco (Becton/Dickinson), Spark, Md.) is prepared by adding 40 g of the powder to 1 L of purified water in a 2 L Erlenmeyer flask set on a stir/hot plate. A 2 in.×½ in. stir bar is added to the Erlenmeyer flask and the stir/hot plate is turned to a medium setting. The TSA solution is mixed thoroughly on the stir/hot plate and is heated to boiling for 1 min. The solution is then autoclaved for 15 min. at 121° C. 15 ml of the TSA is pored into the Petri dish, then is cooled to produce the solid TSA plate. 10 ml of the TSA is poured into a slant tube and cooled at a 45° angle to produce the slant tubes. The Petri dish and slant tubes are grown in an incubator for 24 hours at 37° C. The slant tubes are stored in a 4° C. refrigerator until needed.

Preparation of *E. coli* (ATCC #25922) for testing: A loop of culture from the Petri dish is used to inoculate 100 ml of TSB in a 100 ml conical centrifuge tube. The TSB is incubated and shaken for 24 hr. The 100 ml of TSB is centrifuged at 400 g's for 15 min. The TSB is decanted off and the pellet that remains is resuspended by vortexing in 30 ml of the same water used for testing. The centrifugation is repeated and the water is decanted off and the pellet is resuspended again in 30 ml of the same water used for testing. The *E. coli* is now ready for use in the test.

Preparation of *E. coli* (ATCC #15597) for testing: A loop of culture from the Petri dish is added to 10 ml of TSB. The TSB is incubated at 37° C. for 24 hr. (no shaking). A loop of the TSB is added to 100 ml of TSB in a 150 ml Erlenmeyer flask and is vortexed. 1 ml of the 100 ml TSB is added to a test tube and incubated for 3 hr. at 37° C. with shaking. The *E. coli* is now ready for use as a host in the virus assay portion of the testing and for use is phage preparation.

(2). MS-2 Bacteriophage

MS-2 bacteriophage (phage) (ATCC #15597B) is received lypholized. The phage is resuspended as indicated per ATCC instructions. New stocks of phage must be generated from the resuspended sample every three weeks.

Preparation of Phage Stock:

1) Inoculate 3 ml of TSB in a tube with a colony of host *E. coli* (ATCC #15597) using a loop. Incubate the tube at 37° C. for 24 hr. at which time the *E. coli* will be in the stationary phase.

2) Inoculate a 150 ml Erlenmeyer flask holding 100 ml of TSB with 1 ml of host *E. coli* produced in 1). Incubate at 37° C. for 3 hr. while rotating on a shaker table (150–180 rpm). After the 3 hr. time period, the *E. coli* will be in log phase and ready for use.

3) Prepare a $10^5$ plaques/ml dilution of stock phage (resuspended phage will typically have approximately $10^{11}$ plaques/ml in the stock). Serial dilutions of the phage are made in sterile tris buffered saline at pH 7.0. A serial dilution is performed by taking 0.3 ml of the phage and adding to 2.7 ml of tris buffered saline at pH 7.0 to give a $10^{-1}$ dilution. 0.3 ml of the $10^{-1}$ dilution is added to 2.7 ml of tris buffered saline at pH 7.0 to give a $10^{-2}$ dilution. The serial dilution is continued until a $10^{-6}$ dilution is produced. The phage concentration at this point should be at the desired $10^5$ plaques/ml dilution. Tubes should be vortexed between dilutions and a new pipette should be used between dilutions to avoid carry-over.

4) Melt several tubes of top agar (TSB with 1% Bacto agar (Difco, (Becton/Dickinson, Spark, Md.) by placing them in a steamer with a water bath set at 48° C. Add 1 ml of log phase host *E. coli* per tube. Add 0.1 ml of diluted phage per tube (phage at approximately $10^5$ plaques/ml dilution). Gently vortex and then pour each tube onto solid TSA in a 92 mm×16 mm Petri dish. Let the agar solidify, invert and incubate at 37° C. for 24 hr.

5) After plaques are confluent, add 6 ml of tris buffered saline at pH 7.0 per plate and let it sit at room temperature for 2 hr. to allow the phage to diffuse through the solution. Decant off the eluent and then centrifuge at 10,000 rpm for 10 min.

6) Prepare a sterile 0.2 $\mu$m filter (Costar, Cambridge, Miss.) by passing 5 ml of 3% Beef Extract (Becton/Dickinson, Spark, Md.) through to remove the charge from the filter, then pass the supernatant from the centrifuge tube through the filter.

Titer by performing a plague assay and store the stock at 4° C. Try to get $10^3$–$10^5$ plaques/plate. 24 plates will produce about 50 ml of $10^{11}$ plaques.

The plaque assay is as follows: The phage solution is serially diluted in Tris buffered saline (Trisma, St. Louis, Mo.). The serial dilution is performed by taking 0.3 ml of phage solution and adding to 2.7 ml of tris buffered saline. The dilution is continued until a $10^{-4}$ dilution is produced. The 3 ml dilution is added to 3 ml of molten (46° C.) top agar containing 0.1 ml of log-phase culture of *E. coli* host (ATCC: *E. coli* #15597). The suspension is gently vortexed and poured onto solid tryptic soy agar plates. The solid tryptic soy agar plates, along with the top agar solution that has been added, is incubated for 18–24 hr. at 37° C. and then enumerated by counting plaques formed on the lawn of host *E. coli* cells.

(3). *Cryptosporidium Parvum*

*Cryptosporidium Parvum* (Pleasant Hill Farms, Troy, Id.) is directly added to the water used for testing. Stock titer is determined using 10 ml of cryptosporidium parvum centrifuged in a IEC Clinical Centrifuge (Needhan Hts, Mass.) at 400 g's for 15 min. to pellet the oocysts. The supernatant is aspirated off 1 ml above the pellet. The oocysts are counted using a SPotlite hemocytometer (Baxter Healthcare Corp. McGraw Park, Ill.) by placing 0.2 ml of sample onto the hemocytometer and using a phase contrast microscope (e.g., BH-2 Olympus, Japan) at 400× magnification. At least 12 chamber aliquots are counted for each sample according the procedure outlined in the Guidance Manual (U.S. EPA, October 1990). An average of all readings is multiplied with the conversion factor of $1.0 \times 10^4$. Total numbers of cysts are divided by 10 to determine the number of oocysts per ml of sample.

B. Influent Preparation

Influent test fluid is prepared by adding (seeding) the requisite volume of concentrated stock for each microorganism to 100 L of dechlorinated and sterilized water. The microorganisms are seeded into the 100 L of water as the water is stirred with a 2 in. by ½ in. stir bar at maximum speed. The target concentration in the influent, based on the dilution from the concentrated stock, are listed in Table A. A 50 ml sample of influent is collected into a 50 ml graduated conical centrifuge tube for assay of MS-2 bacteriophage, *E. coli*, and *Cryptosporidium parvum*. Assay conditions for assessing removal of each of the microorganisms are described below.

The following is an example of how to calculate the volume of microorganisms to be added to 100 L of water for testing.

Example: If the concentration of *E. coli* is estimated to be $1 \times 10^9$ organisms/ml and the target concentration in 100 liters of water is $5 \times 10^8$ organisms/L, 50 ml of the stock *E. coli* needs to be added to 100 liters to obtain this concentration. The calculation is as follows:

$1 \times 10^9$ organisms/ml*Y ml added/100 liters=$5 \times 10^8$ organisms/liter, then Y ml added=($5 \times 10^8$ organisms/L * 100 L)/($1 \times 10^9$ organism/ml), then Y ml added=50 ml

TABLE A

| Microorganism | Microorganisms/L |
| --- | --- |
| E. coli | $5 \times 10^8$ |
| MS-2 | $5 \times 10^8$ |
| C. parvum | $6 \times 10^6$ |

C. Microorganism Filtration

A test filter is connected to an EXPERT Peristaltic pump (model CP-120) produced by Scilog, Inc. (Madison, Wis.), or an equivalent pump, using Pharmed tubing (¼ in. ID with ¹⁄₁₆ in. wall thickness). The pump is calibrated to a flow rate of 100 ml/min. using dechlorinated and sterile water.

Influent is flowed through the test filter at a rate of 100 ml/min. for 15 hr. 50 ml samples of effluent are collected into 50 ml graduated conical centrifuge tubes for assay of MS-2 bacteriophage and *E. coli* at 1 hr., 3 hr., 6 hr., 10 hr. and 15 hr. Three 50 ml samples of effluent are collected into graduated conical centrifuge tubes for assay of *Cryptosporidium parvum* at the same time intervals as above. Table B outlines the amount of sample needed to perform an assay of each microorganism.

TABLE B

| Microorganism | Influent (ml/sample needed) | Effluent (ml/sample needed) |
| --- | --- | --- |
| E. coli | 1 | 1 |
| MS-2 | 1 | 1 |
| C. parvum | 10 | 100 |

D. Assay Conditions for Determining Pathogen Removal Indices (1). Bacteria Removal Index The Bacteria Removal Index is determined according to the following formula:

$$BRI = [1 - (\text{Effluent Concentration})/(\text{Influent Concentration})] \times 100$$

Bacteria assay is conducted using the membrane filter technique according to "Standard Methods for the Examination of Water and Wastewater" (American Public Health Association (APHA), 20$^{th}$ edition, method #9222) on m-Endo Agar LES (Becton Dickinson Co., Cockeysville, Md.; Cat. #: 4311203). Serial dilution of influent samples is made in sterile tris buffered saline at pH 7.0. A serial dilution is performed by taking 0.3 ml of influent and adding it to 2.7 ml of tris buffered saline at pH 7.0 to give a 10:1 dilution. 0.3 ml of the 10:1 dilution is added to 2.7 ml of tris buffered saline (Trisma, Inc., St. Louis, Mo.) at pH 7.0 to give a 100:1 dilution. The serial dilution is continued until a $10^6:1$ dilution is produced. A serial dilution of effluent samples collected from the test units is performed until a $10^4:1$ dilution is produced. The influent and effluent dilution assays and measurements are performed in duplicate according to "Standard Methods for the Examination of Water and Wastewater" (APHA, 20$^{th}$ edition, method #9222).

(2). Virus Removal Index

The Virus Removal Index is determined according to the following formula:

$$VRI = [1 - (\text{Effluent Concentration})/(\text{Influent Concentration})] \times 100$$

Influent or effluent samples are serially diluted in tris buffered saline in the same manner as the *E. coli* samples by taking 0.3 ml of influent or effluent and adding to 2.7 ml of tris buffered saline. The dilution is continued until a $10^4:1$ dilution is produced. The 3 ml dilution is added to 3 ml of molten (46° C.) top agar (tryptic soy broth with 1% Bacto agar, Difco; Becton/Dickinson, Inc., Spark, Md.) containing 0.1 ml of log-phase culture of *E. coli* host (ATCC #15597). The suspension is gently vortexed and poured onto solid tryptic soy agar plates. The tryptic soy agar (Difco; Becton/Dickinson, Inc.) is prepared by adding 40 g of the powder to 1 L of purified water in a 2 L Erlenmeyer flask set on a stir/hot plate. A 2 in.×½ in. stir bar is added to the Erlenmeyer flask and the stir/hot plate is turned up to a medium setting. The tryptic soy agar solution is mixed thoroughly on the stir/hot plate and heated to boiling for 1 min. The solution is then autoclaved for 15 min. at 121° C. 15 ml of the tryptic soy agar is poured into a 92 mm×16 mm sterile Petri dish then cooled to produce the solid tryptic soy agar plate. The solid tryptic soy agar plates, along with the top agar solution that has been added, is incubated for 18–24 hr. at 37° C. and then enumerated by counting plaques formed on the lawn of host *E. coli* cells.

(3). Parasite/Protozoa Removal Index

The Parasite Removal Index is determined according to the following formula:

$$PRI = [1 - (\text{Effluent Concentration})/(\text{Influent Concentration})] \times 100$$

The *Cryptosporidium parvum* assay for measuring PRI is conducted by taking 10 ml of influent or 100 ml of effluent samples collected from the filters. The samples are centrifuged in a IEC Clinical Centrifuge (Needhan Hts, Mass.) at 400 g's for 15 min. to pellet the oocysts. The supernatant is aspirated off 1 ml above the pellet. The oocysts are counted using a SPotlite hemocytometer (Baxter Healthcare Corp. McGraw Park, Ill.) by placing 0.2 ml of sample onto the hemocytometer and using a phase contrast microscope (BH-2 Olympus, Japan) at 400× magnification. At least 12 chamber aliquots are counted for each sample according to the procedure outlined in the Guidance Manual (U.S. EPA, October 1990). An average of all readings is multiplied with the conversion factor of $1.0 \times 10^4$. Total numbers of cysts are then divided by 10 for influent samples and by 100 ml for effluent samples to determine the number of oocysts per ml of sample.

V. EXAMPLES

The following Examples 1 and 2 illustrate a filter of the present invention comprising free ACFs and also illustrate how one measures the BRI, VRI and PRI, as per the description in the Test Methods described in Section IV above. It should be recognized that while these pathogen removal indices relate to a flow rate of test fluid of 100 ml/min., many of the filters of the present invention will exhibit similar removal benefits at significantly higher flow rates.

Example 1

Filter Preparation

Free ACF is packed for analysis as filters utilizing stainless steel cylindrical holders available from Robert James Sales, Inc., Cincinnati, Ohio, as part #PR1216. These holders have an internal diameter of 2.54 cm. The stainless steel holders are cleaned with dish washing detergent (e.g. Dawn®), bleach (e.g. Clorox®) and diluted with tap water (e.g., 5:1000 dilution). The holders are rinsed with warm tap water, then rinsed again with isopropyl alcohol. The holders are air dried for 3 hours then assembled and packed according to the following procedure.

An effluent end cap and gasket are clamped onto the stainless steel holders. An O-ring, a spacer, and a one inch diameter 80 mesh stainless steel screen is placed into the bottom of the tube. Fourteen grams of Anshan's Carboflex® P200T pitch-based activated carbon fiber are added to the holder. An O-ring, a stainless steel 80 mesh screen and spacer are inserted in order on top of the ACF in the cylinder. A gasket is placed on top of the holder. An influent piston/screw end cap, with O-rings added to the piston, is inserted into the top of the holder and clamped on using a sanitary fitting clamp. A 8.76 cm target bed depth of ACF material is achieved by adjusting the piston position using a socket wrench. The bed volume is 44.4 cm$^3$.

Influent Preparation

The influent is prepared by adding (seeding) the requisite volume of concentrated stock for each microorganism to 100 L of dechlorinated and sterilized water. The microorganisms are seeded into the 100 liters of water as the water is stirred with a 2 in. by ½ in. stir bar at maximum speed. The microorganisms used are MS-2 bacteriophage (American Type Culture Collection (ATCC); Rockville, Md.; ATCC # 15597B), E. coli (ATCC # 25922) and Cryptosporidium parvum (Pleasant Hill Farm; Troy, Id.). The handling of the microorganisms and the determination of the volume of concentrated stock to add to the 100 L of water is described below in Section IX—Test Methods. The target concentrations in the influent are listed in Table C. A 50 ml sample of influent is collected (i.e., prior to passing through the filter) into a 50 ml graduated conical centrifuge tube for assay of MS-2 bacteriophage, E. coli, and Cryptosporidium parvum.

TABLE C

| Microorganism | Organism/L |
| --- | --- |
| E. coli | 5 × 10$^8$ |
| MS-2 | 5 × 10$^8$ |
| Cryptosporidium parvum | 6 × 10$^6$ |

Microorganism Filtration

The filters prepared above are connected to an EXPERT Peristaltic pump (model CP-120) produced by Scilog, Inc. (Madison, Wis.) using Pharmed tubing (¼ in. ID with 1/16 in. wall thickness). The pump is calibrated to a flow rate of 100 ml/min using dechlorinated and sterile water.

Influent is flowed through the sample filter at a rate of 100 ml/min. for 15 hours (i.e., 135 bed or column volumes/hr). 50 ml samples of effluent are collected into 50 ml graduated conical centrifuge tubes for assay of MS-2 bacteriophage and E. coli at 1 hr., 3 hr., 6 hr., 10 hr. and 15 hr. Three 50 ml samples of effluent are collected into graduated conical centrifuge tubes for assay of Cryptosporidium parvum at the same time intervals as above. Table D outlines the amount of sample needed to perform an assay of each microorganism.

TABLE D

| Microorganism | Influent (ml/sample needed) | Effluent (ml/sample needed) |
| --- | --- | --- |
| E. coli | 1 | 1 |
| MS-2 | 1 | 1 |
| C. parvum | 10 | 100 |

Microorganism Assays

Bacteria assay is conducted using the membrane filter technique according to "Standard Methods for the Examination of Water and Wastewater" (American Public Health Association (APHA), 20$^{th}$ edition, method #9222) on m-Endo Agar LES (Becton Dickinson Co., Cockeysville, Md.; Cat. #: 4311203). Serial dilution of influent samples is made in sterile tris buffered saline at pH 7.0. A serial dilution is performed by taking 0.3 ml of influent and adding it to 2.7 ml of tris buffered saline at pH 7.0 to give a 10:1 dilution. 0.3 ml of the 10:1 dilution is added to 2.7 ml of tris buffered saline (Trisma, Inc., St. Louis, Mo.) at pH 7.0 to give a 100:1 dilution. The serial dilution is continued until a 106:1 dilution is produced. A serial dilution of effluent samples collected from the test units is performed until a 10$^4$:1 dilution is produced. The influent and effluent dilution assays and measurements are performed in duplicate according to "Standard Methods for the Examination of Water and Wastewater" (APHA, 20$^{th}$ edition, method #9222).

For bacteriophage MS-2, the influent or effluent samples are serially diluted in tris buffered saline in the same manner as the E. coli samples by taking 0.3 ml of influent or effluent and adding to 2.7 ml of tris buffered saline. The dilution is continued until a 10$^4$:1 dilution is produced. The 3 ml dilution is added to 3 ml of molten (46° C.) top agar (tryptic soy broth with 1% Bacto agar, Difco; Becton/Dickinson, Inc., Spark, Md.) containing 0.1 ml of log-phase culture of E. coli host (ATCC #15597). The suspension is gently vortexed and poured onto solid tryptic soy agar plates. The tryptic soy agar (Difco; Becton/Dickinson, Inc.) is prepared by adding 40 g of the powder to 1 L of purified water in a 2 L Erlenmeyer flask set on a stir/hot plate. A 2 in.×½ in. stir bar is added to the Erlenmeyer flask and the stir/hot plate is turned up to a medium setting. The tryptic soy agar solution is mixed thoroughly on the stir/hot plate and heated to boiling for 1 min. The solution is then autoclaved for 15 min. at 121° C. 15 ml of the tryptic soy agar is poured into a 92 mm×16 mm sterile Petri dish then cooled to produce the solid tryptic soy agar plate. The solid tryptic soy agar plates, along with the top agar solution that has been added, is incubated for 18–24 hours at 37° C. and then enumerated by counting plaques formed on the lawn of host E. coli cells.

The Cryptosporidium parvum assay is conducted by taking 10 ml of influent or 100 ml of effluent samples collected from the filters. The samples are centrifuged in a IEC Clinical Centrifuge (Needhan Hts, Mass.) at 400 g's for 15 min. to pellet the oocysts. The supernatant is aspirated off 1 ml above the pellet. The oocysts are counted using a SPotlite hemocytometer (Baxter Healthcare Corp. McGraw Park, Ill.) by placing 0.2 ml of sample onto the hemocytometer and using a phase contrast microscope (BH-2 Olympus, Japan) at 400× magnification. At least 12 chamber aliquots are counted for each sample according to the procedure outlined in the Guidance Manual (U.S. EPA, October 1990). An average of all readings is multiplied with the conversion factor of $1.0 \times 10^4$. Total numbers of cysts are then divided by 10 for influent samples and by 100 ml for effluent samples to determine the number of oocysts per ml of sample.

Results

The test filter demonstrates the following pathogen removal properties:

| TIME | BRI | VRI | PRI |
| --- | --- | --- | --- |
| 1 Hour | 99.99998% | 99.99992% | 99.96% |
| 3 Hour | 99.99998% | 99.99992% | 99.96% |
| 6 Hour | 99.99998% | 99.99992% | 99.96% |
| 10 Hour | 99.99990% | 99.99992% | N/A |
| 15 Hour | 99.99987% | 99.99992% | N/A |

Example 2

A filter is prepared according to Example 1, except Anshan's Carboflex® P3200 pitch-based activated carbon fiber is added until 14.0 grams is reached. A 10.86 cm target bed depth of ACF material is achieved by adjusting the end screw length using a socket wrench. The filtration and assay protocols are performed the same as Example 1. The bed volume is 55 cm3 and the flow rate is 109 bed volumes/hour.

The test filter demonstrates the following pathogen removal properties:

| TIME | BRI | VRI | PRI |
| --- | --- | --- | --- |
| 1 Hour | 99.99998% | 99.99975% | 99.96% |
| 3 Hour | 99.99998% | N/A | 99.96% |
| 6 Hour | 99.99998% | 99.99975% | 99.96% |
| 10 Hour | 99.99998% | 99.99975% | N/A |

What is claimed is:

1. A process for forming an activated carbon fiber filter for removing viruses from liquids comprising the steps of selecting a plurality of activated carbon fibers, placing said activated carbon fibers in a hollow form open at least one end, and applying a predetermined compressive force to the fibers along the axis through the said hollow form parallel to the direction in which said liquids will pass until said fibers are densely and uniformly packed within said form.

* * * * *